United States Patent
Lisenker et al.

(10) Patent No.: US 6,516,926 B2
(45) Date of Patent: Feb. 11, 2003

(54) PISTON ROD SURFACE FINISH REQUIREMENT FOR MR DAMPENING DEVICES

(75) Inventors: Ilya Lisenker, Miamisburg, OH (US); Patrick Neil Hopkins, West Carrollton, OH (US); William Charles Kruckemeyer, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/810,350

(22) Filed: Mar. 16, 2001

(65) Prior Publication Data

US 2002/0162713 A1 Nov. 7, 2002

(51) Int. Cl.$^7$ ................................................. F16F 9/53
(52) U.S. Cl. ................................................. 188/267.1
(58) Field of Search ........................... 188/267.1, 267.2

(56) References Cited

U.S. PATENT DOCUMENTS

| | | |
|---|---|---|
| 4,682,444 A | 7/1987 | Judge et al. |
| 4,991,361 A | 2/1991 | Huppert et al. |
| 4,993,190 A | 2/1991 | Hiyoshi |
| 4,993,191 A | 2/1991 | Judge et al. |
| 5,245,793 A | 9/1993 | Schmitz |
| 5,249,393 A | 10/1993 | Judge et al. |
| 5,437,125 A | 8/1995 | Barton, II |
| 5,490,808 A | 2/1996 | Jantschek et al. |
| 5,529,529 A | 6/1996 | Judge et al. |
| 5,531,631 A | 7/1996 | Judge |
| 5,618,225 A | 4/1997 | Jantschek et al. |
| 5,695,391 A | 12/1997 | Steinwender |
| 5,725,421 A | 3/1998 | Goers et al. |
| 5,865,669 A | 2/1999 | Kiriyama et al. |
| 5,878,851 A | 3/1999 | Carlson et al. .......... 188/267.1 |
| 6,074,284 A | 6/2000 | Tani et al. |

Primary Examiner—Matthew C. Graham
(74) Attorney, Agent, or Firm—Scott A. McBain

(57) ABSTRACT

A piston rod for use in a magnetorheological dampening device having a surface finish that renders the device resistant to wear at the elastomeric seal/piston rod interface. The piston rod has a surface finish of Ra<0.065 $\mu$m and $\Delta a \leq 1.4°$, as measured using a Gaussian filter with a 0.08 mm cut-off length. There is further provided a method of achieving the surface finish, including rotating the piston rod while moving an abrasive tape against the outer surface of the rod.

15 Claims, 3 Drawing Sheets

PISTON ROD SURFACE FINISH REQUIREMENT FOR MR DAMPENING DEVICES

FIELD OF THE INVENTION

This invention relates to magnetorheological dampers and, in particular, to the surface finish of piston rods operating in said dampers.

BACKGROUND OF THE INVENTION

Magnetorheological (MR) dampening devices are used in various applications, such as dampers, shock absorbers, and elastomeric mounts, for dampening and controlling vibration. Devices utilizing the unique properties of magnetorheological fluids are used to control pressure in valves and to control the transfer of torque in brakes and clutches.

Magnetorheological (M) fluids are fluid compositions that undergo a change in apparent viscosity in the presence of a magnetic field. A typical MR fluid contains ferromagnetic microparticles suspended in a low viscosity carrier liquid which are capable of becoming polarized in the presence of an applied magnetic field. The particles become organized into chains of particles within the fluid. The particle chains increase the apparent viscosity (flow resistance) of the fluid. The particles return to an unorganized state when the magnetic field is removed, which lowers the viscosity of the fluid.

FIG. 1 shows a known monotube MR damper 10 for use in the suspension system of a vehicle having a piston 12 sliding within a hollow tube 14 filled with MR fluid 16. The piston 12 is attached to a hollow rod 18, referred to herein as the piston rod, that slides within a sealed bearing 20 at one end of the body of the damper 10. The piston 12 contains a coil 22, which carries a variable current, thus generating a variable magnetic field across a flow gap 24 between an inner core 26 and an outer shell or flux ring 28 of the piston 12. A bearing 30 having relatively low friction is disposed between the flux ring 28 and the tube 14. The flux ring 28 and the inner core 26 of the piston 12 are held in place by spoked end plates 32. Terminals 34 of the coil 22 extend through the piston rod 18 and are provided with suitable insulation for connection to a source of electricity (not shown). One end 36 of the tube 14 is filled with inert gas which is separated from the MR fluid 16 by a floating piston or sealed gas cap 38. The floating gas cap 38 accommodates the displacement of MR fluid 16 due to the varying length of piston rod 18 immersed within the MR fluid 16 of hollow tube 14 as the piston 12 moves and to accommodate thermal expansion of the MR fluid 16. The circumference of the gas cap 38 includes an o-ring 40 that provides a fluid-tight sealing engagement with the hollow tube 14. The hollow tube is sealed by end caps 42,44 and attachment eyes 46,48 are provided on the respective end caps 42,44 for installing MR damper 10 to a vehicle body (not shown).

In response to vibration-induced movement of the piston rod 18, MR fluid 16 flows through the flow gap 24. When the coil 22 is energized, the effective viscosity of the MR fluid 16 in the flow gap 24 is increased by the interaction of the microparticles with the applied magnetic field. Variations in the electrical current flowing to coil 22 can be used to modulate the strength of the applied magnetic field and, thereby, to control the apparent viscosity of the flowing MR fluid 16. The modulation of the apparent viscosity affects the flow rate of the MR fluid 16 through the flow gap 24 to achieve a desired dampening effect.

The MR fluid 16 provided in the hollow tube 14 comprises a plurality of soft ferromagnetic microparticles that are dispersed and suspended in a base liquid, preferably in a low viscosity base liquid. Suitable microparticles include powders of carbonyl iron, magnetite, iron alloys (such as those including aluminum, silicon, cobalt, nickel, vanadium, molybdenum, chromium, tungsten, manganese and/or copper), iron oxides, iron nitrides, iron carbides, chromium dioxide, low carbon steel, silicon steel, nickel, cobalt, and other materials known to exhibit MR activity.

A suitable microparticle size exhibits multi-domain characteristics when subjected to a magnetic field. For spherical or near-spherical particles, a suitable size distribution for the microparticles ranges between nominal diameters of about 1 and about 25 $\mu$m, usually between about 1 $\mu$m and about 6 $\mu$m. The microparticles are preferably present in an amount between about 50 and 90 percent by weight of the total composition of the MR fluid 16. Suitable base liquids include hydrocarbon oil, silicone oil, paraffin oil, mineral oil, chlorinated and fluorinated fluids, kerosene, glycol, or water. A particularly suitable MR fluid 16 comprises carbonyl iron powder suspended in a synthetic hydrocarbon oil.

Because the microparticles are quite small, they have a tendency to become trapped in valleys that are created in the surface of the piston rod during the superfinishing or microfinishing process. The trapped particles are then dragged past the damper seal 20. The microparticles in the MR fluid 16 are highly abrasive and can damage the seal 20. As a result, the MR fluid 16 can eventually escape through the degraded seal and, ultimately, the MR dampening device can prematurely fail.

There is thus a need to prevent the damper seal from being damaged by particle abrasion from the MR fluid and moving piston rod.

SUMMARY OF THE INVENTION

The present invention provides a piston rod for use in a magnetorheological dampening device that has a surface finish that renders the dampening device resistant to wear at the elastomeric seal/piston rod interface. To this end, and in accordance with the present invention, the piston rod has a surface finish of Ra<0.065 $\mu$m and $\Delta a \leq 1.4°$, as measured using a Gaussian filter with a 0.08 mm cut-off length. A magnetorheological dampening device operating with a piston rod having the surface finish of the present invention resists wear from an MR fluid having particles of less than about 16 $\mu$m in diameter in fluid communication with the piston rod and elastomeric seal. The present invention further provides a method of achieving the surface finish, including rotating the piston rod while moving an abrasive tape against the outer surface of the rod.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
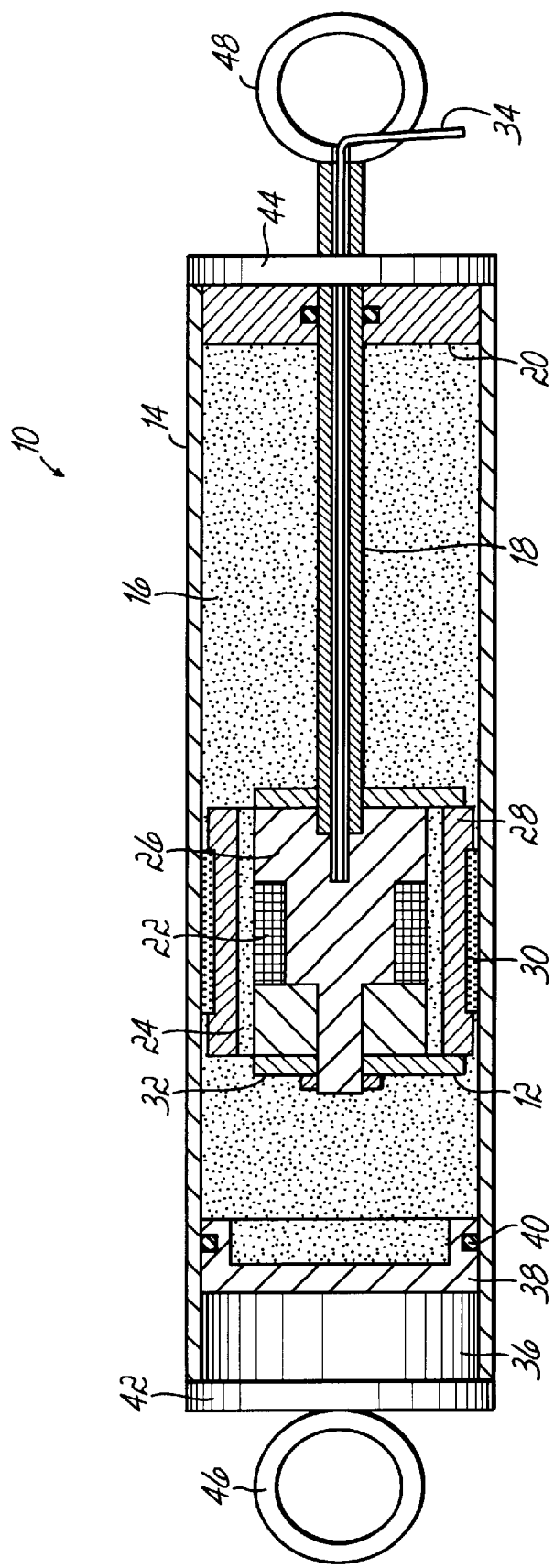
FIG. 1 is a cross-sectional view of a conventional MR damper.

The present invention provides a piston rod surface finish requirement for MR dampers that addresses the problem of wear at the seal/piston rod interface by enabling the particles to be wiped off the rod and prevented from being trapped within the sealing interface. With specific reference to the MR damper 10 of FIG. 1, the present invention addresses wear between piston rod 18 and sealed bearing 20. The geometry of the piston rod surface plays an important role in the seal's ability to wipe particles off the piston rod surface.

Figure 2:
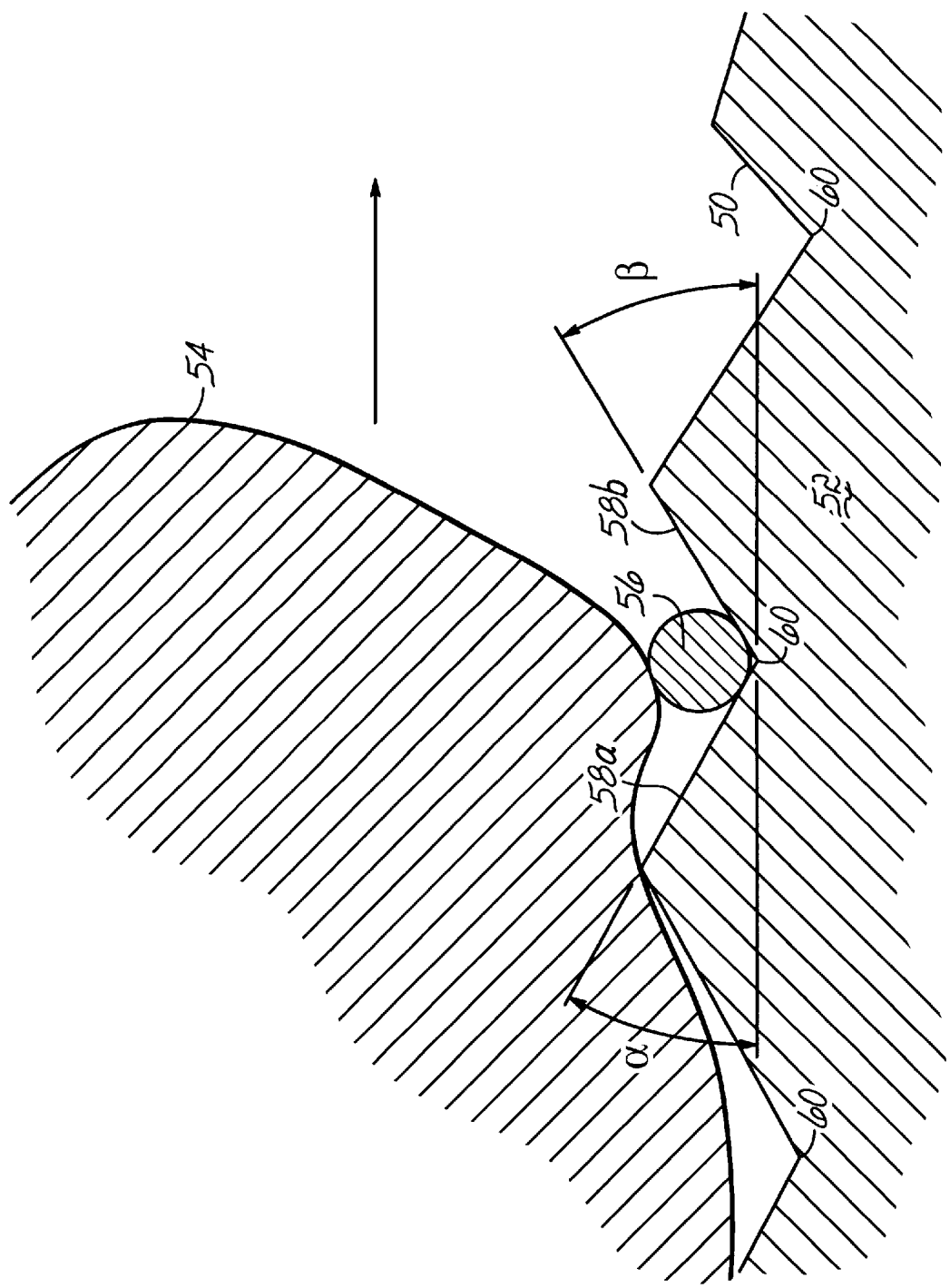
FIG. 2 is a partial cross-sectional view of a piston rod and seal illustrating particle trapping in the rod surface.

FIG. 2 illustrates a typical surface 50 of a damper piston rod 52 interacting with a seal 54 and a particle 56. The seal 54 is incapable of following the surface 50 of the rod 52, which allows it to roll onto the particle 56. Moreover, the sides 58a, 58b of the valleys 60 are too steep for the particle 56 to roll onto. The valleys 60 are created in the surface 50 of the piston rod 52 during the superfinishing process, which is a known technique of abrasive surface finishing. By way of definition, grinding typically uses a grinding surface that is greater than the surface area of the part to be ground. Surperfinishing or honing typically uses a grinding surface that is smaller than the surface area of the part to be finished.

For the seal 54 to wipe the particles 56 off the surface 50, the angles α and β must be lower than a certain critical angle. Such a requirement necessitates a specification beyond traditional Ra and Rz values because those values deal exclusively with heights of the surface irregularities. In accordance with the present invention, the appropriate measurement is a Δa number, which is defined as the arithmetical mean slope of the profile created over the entire evaluation length.

Figure 3:
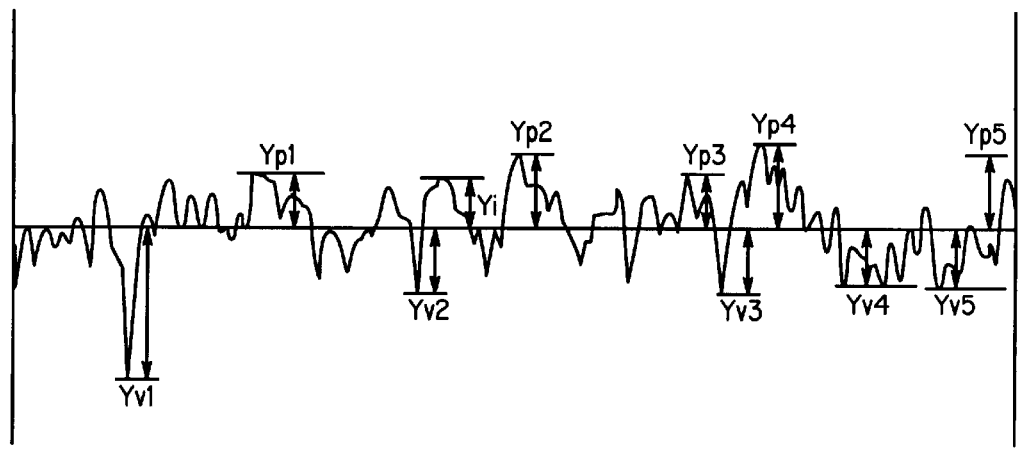
FIGS. 3 and 4 are graphical depictions of the variables used in calculating the various designations of surface roughness described herein.
Figure 4:
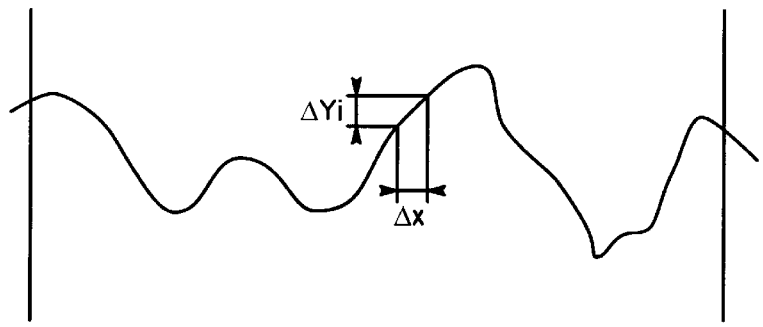

By way of definition, Ra and Rz are defined as follows:

$$Ra = \frac{1}{N} \sum_{i=1}^{N} |Yi|$$

$$Rz = \frac{1}{5} \sum_{i=1}^{5} Ypi + \frac{1}{5} \sum_{i=1}^{5} Yvi$$

wherein Yi, Ypi and Yvi are shown in FIG. 3. Ra is a well known surface roughness variable, and is defined as the arithmetical mean deviation of the profile. Rz is also a well known surface roughness variable, referred to as the 10 point height, and is the total of two means which are the average height of the 5 highest peaks and the average depth of the 5 deepest valleys, measured by each line tangent to a peak or valley and parallel to the mean line. Δa, which is referred to as the arithmetical mean slope of the profile, is calculated as follows:

$$\Delta a = \frac{1}{N-1} \sum_{i=1}^{N-1} \left\{ \tan^{-1} \left| \left( \frac{\Delta Yi}{\Delta x} \right) \right| \right\}$$

where ΔYi and Δx are as shown in FIG. 4.

In accordance with the principles of the present invention, for use with MR fluids having particles of less than about 16 μm in diameter, the piston rod of a magnetorheological dampening device should have a surface finish of Ra<0.065 μm and Δa≦1.4°, as measured using a Gaussian filter with a 0.08 mm cut-off length. The Rz value, which correlates with the Ra value, should advantageously be less than about 0.32 μm. For example, for a polyurethane seal and MR fluid containing particles from about 1 to 12 μm in diameter, the piston rod surface requirements are as follows: Ra less than about 0.065 μm, Rz less than about 0.32 μm, and Δa less than or equal to about 1.4°, with Δa being measured using a Gaussian filter with a 0.08 mm cut-off length. One skilled in the art may appreciate that the Gaussian filter will eliminate about 50% of the measured wavelengths greater than the cut-off length.

Figure 5:
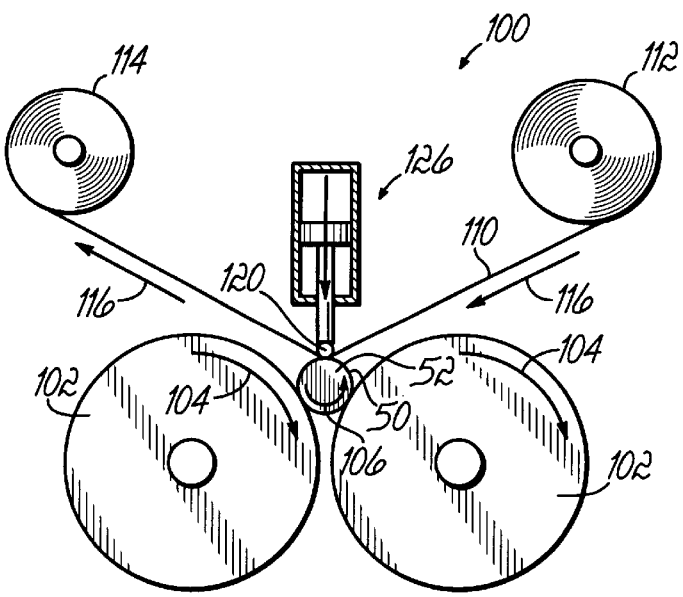
FIG. 5 is a cross-sectional view of an apparatus for achieving the surface finish of the present invention.

The surface finish of the present invention may be accomplished by rotating the piston rod while pressing against its outer surface an abrasive tape for a period of time sufficient to achieve the surface finish of Ra<0.065 μm and Δa≦1.4°. By way of specific example, and not limitation, the surface finish of the present invention may be accomplished using a finishing station 100 as depicted in FIG. 5. Finishing station 100 is one example of an apparatus that may be used to achieve the surface finish of the present invention, but the invention should be not limited strictly to the apparatus shown and described herein. Further, finishing station 100 is depicted with only the essential parts necessary for describing the present invention.

In station 100, piston rod 52 is placed between two driven rollers 102. The drive, not described further here, moves the rollers 102 in the direction of the arrows 104, whereby the piston rod 52 turns in the direction of arrow 106. An abrasive tape 110 is provided from supply reel 112 and collected in take-up reel 114. Tape 110 moves in the direction of arrows 116 along the surface 50 of rotating rod 52. Tape 110 is pressed onto surface 50 of piston rod 52 by means of a platen roller 120 activated by a pneumatic cylinder 126.

The abrasive tape 110 used in the finishing apparatus 100 may be any abrasive tape capable of achieving the surface finish of the present invention. For example, the tape may be Metalite™ Q 151 available from Norton or may be any of various tapes available from 3M™, including: Imperial™ Lapping Film, Imperial™ Fre-Cut™ Microfinishing Film, and Imperial™ Microfinishing Film. In an example of the present invention, the abrasive tape 110 has a micron grade of about 3 to about 20, with a micron grade of about 9 being most effective.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A method for finishing the surface of a piston rod for use a magnetorheological dampening device, the method comprising:

rotating the piston rod; and pressing against an outer surface of the rotating rod an abrasive tape for a time sufficient to achieve a surface finish of Ra<0.065 μm and Δa≦1.4°, as measured using a Gaussian filter with a 0.08 mm cut-off length.

2. The method of claim 1, comprising pressing against the outer surface an abrasive tape having a micron grade of about 3 to about 20.

3. The method of claim 1, comprising pressing against the outer surface an abrasive tape having a micron grade of about 9.

4. A method for finishing the surface of a piston rod for use a magnetorheological dampening device, the method comprising:

placing the piston rod between two driven rollers to rotate the piston rod in a first direction; and moving against an outer surface of the rotating rod an abrasive tape in the first direction for a time sufficient to achieve a surface finish of Ra<0.065 μm and Δa≦1.4°, as measured using a Gaussian filter with a 0.08 mm cut-off length.

5. The method of claim 4, further comprising, during passing, pressing the tape onto the outer surface by a roller.

6. The method of claim 4, further comprising feeding a section of the tape to the outer surface by a tape supply reel and collecting the section of the tape by a take-up reel after the step of moving the tape against the outer surface.

7. The method of claim 4, further comprising continuously feeding the tape to the outer surface by a tape supply reel and continuously collecting the tape by a take-up reel during the step of moving the tape against the outer surface.

8. The method of claim 4, comprising moving against the outer surface an abrasive tape having a micron grade of about 3 to about 20.

9. The method of claim 4, comprising moving against the outer surface an abrasive tape having a micron grade of about 9.

10. A piston rod for use in a magnetorheological dampening device containing an MR fluid having particles of less than about 16 μm in diameter, the rod having a surface finish of Ra<0.065 μm and Δa≦1.4°, as measured using a Gaussian filter with a 0.08 mm cut-off length.

11. A piston rod for use in a magnetorheological dampening device containing an MR fluid having particles of less than about 16 μm in diameter, the rod having a surface finish of Ra<0.065 μm and Δa≦1.4°, as measured using a Gaussian filter with a 0.08 mm cut-off length, wherein the rod is made by the method comprising:

rotating the piston rod; and pressing an abrasive tape against an outer surface of the rotating rod for a time sufficient to achieve a surface finish of Ra<0.065 μm and Δa≦1.4°, as measured using a Gaussian filter with a 0.08 mm cut-off length.

12. A piston rod for use in a magnetorheological dampening device containing an MR fluid having particles of less than about 16 μm in diameter, the rod having a surface finish of Ra<0.065 μm and Δa≦1.4°, as measured using a Gaussian filter with a 0.08 mm cut-off length, wherein the rod is made by the method comprising:

placing the piston rod between driven rollers to rotate the piston rod in a first direction; and moving an abrasive tape against an outer surface of the rotating rod in the first direction for a time sufficient to achieve a surface finish of Ra<0.065 μm and Δa≦1.4°, as measured using a Gaussian filter with a 0.08 mm cut-off length.

13. A magnetorheological dampening device comprising an elastomeric seal slidably receiving a piston rod having a surface finish of Ra<0.065 μm and Δa≦1.4°, as measured using a Gaussian filter with a 0.08 mm cut-off length, and an MR fluid having particles of less than about 16 μm in diameter in fluid communication with the rod and seal.

14. A magnetorheological dampening device including an elastomeric seal slidably receiving a piston rod having a surface finish of Ra<0.065 μm and Δa≦1.4°, as measured using a Gaussian filter with a 0.08 mm cut-off length, and an MR fluid having particles of less than about 16 μm in diameter in fluid communication with the rod and seal, wherein the rod is made by the method comprising:

rotating the piston rod; and pressing an abrasive tape against an outer surface of the rotating rod for a time sufficient to achieve a surface finish of Ra<0.065 μm and Δa≦1.4°, as measured using a Gaussian filter with a 0.08 mm cut-off length.

15. A magnetorheological dampening device including an elastomeric seal slidably receiving a piston rod having a surface finish of Ra<0.065 μm and Δa≦1.4°, as measured using a Gaussian filter with a 0.08 mm cut-off length, and an MR fluid having particles of less than about 16 μm in diameter in fluid communication with the rod and seal, wherein the rod is made by the method comprising:

placing the piston rod between two driven rollers to rotate the piston rod in a first direction; and moving an abrasive tape against an outer surface of the rotating rod in the first direction for a time sufficient to achieve a surface finish of Ra<0.065 μm and Δa≦1.4°, as measured using a Gaussian filter with a 0.08 mm cut-off length.

* * * * *